(12) United States Patent  
Seiver et al.

(10) Patent No.: US 7,204,101 B2  
(45) Date of Patent: Apr. 17, 2007

(54) METHODS AND SYSTEMS FOR OPTIMIZING ARGON RECOVERY IN AN AIR SEPARATION UNIT

(75) Inventors: David S. Seiver, Houston, TX (US); Scott A. Swafford, Lake Jackson, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 426 days.

(21) Appl. No.: 10/776,346

(22) Filed: Feb. 12, 2004

(65) Prior Publication Data

US 2005/0072187 A1   Apr. 7, 2005

Related U.S. Application Data

(60) Provisional application No. 60/509,139, filed on Oct. 6, 2003.

(51) Int. Cl.  
*F25J 3/00* (2006.01)

(52) U.S. Cl. .......................................... 62/656; 62/924

(58) Field of Classification Search ................. 62/643, 62/654, 656, 657, 606, 924  
See application file for complete search history.

(56) References Cited

U.S. PATENT DOCUMENTS

| | | | |
|---|---|---|---|
| 3,912,476 A * | 10/1975 | Mikawa et al. ............... 62/646 |
| 4,784,677 A | 11/1988 | Al-Chalabi | |
| 4,842,625 A | 6/1989 | Allam et al. | |
| 5,313,800 A | 5/1994 | Howard et al. | |
| 5,448,893 A | 9/1995 | Howard et al. | |
| 5,469,710 A | 11/1995 | Howard et al. | |
| 6,006,546 A * | 12/1999 | Espie ........................... 62/656 |
| 6,055,524 A * | 4/2000 | Cheng .......................... 706/23 |
| 6,622,521 B2 | 9/2003 | Seiver et al. | |
| 2002/0017113 A1 | 2/2002 | Seiver et al. | |

FOREIGN PATENT DOCUMENTS

| | | |
|---|---|---|
| DE | 10130754 | 1/2003 |
| EP | 0669509 | 8/1995 |
| EP | 0701186 | 3/1996 |

OTHER PUBLICATIONS

European Search Report

\* cited by examiner

*Primary Examiner*—Cheryl Tyler  
*Assistant Examiner*—Michael J. Early  
(74) *Attorney, Agent, or Firm*—Elwood L. Haynes

(57) ABSTRACT

A cryogenic air separation system that optimizes the recovery of argon includes an air intake, a high-pressure distillation column, a low-pressure distillation column, a crude argon distillation column, and a controller that automatically controls the composition of the raw argon stream to decrease the concentration of oxygen in the stream while preventing the concentration of nitrogen in the crude argon stream from exceeding a selected value. In addition, the controller also controls the composition of the crude argon stream until an oxygen concentration of the crude argon stream reaches a selected value. The controller may include a multivariable predictive controller.

6 Claims, 2 Drawing Sheets

METHODS AND SYSTEMS FOR OPTIMIZING ARGON RECOVERY IN AN AIR SEPARATION UNIT

CROSS-REFERENCE TO RELATED APPLICATIONS

This application claims priority from U.S. Provisional Patent Application Ser. No. 60/509,139, entitled "MVPC-Based Air Separation Unit Argon Recovery Optimizer" and filed Oct. 6, 2003. The disclosure of the above-mentioned provisional application is incorporated herein by reference in its entirety.

BACKGROUND OF INVENTION

1. Field of Invention

The present invention pertains to methods and systems for optimizing argon recovery in an air separation unit.

2. Related Art

Cryogenic Air Separation Units (ASUs) have been used to produce oxygen, nitrogen, and argon gases by cooling, liquefying, and distilling air. In a basic system, air is compressed and separated using high- and low-pressure cryogenic distillation columns. In the high-pressure column, nitrogen is separated from the air, creating oxygen rich liquid at the bottom and nitrogen rich liquid and vapor at the top. These products are extracted and some are fed separately to the low-pressure column. Due to the differences in relative volatility between argon, nitrogen, and oxygen, substantially pure gaseous nitrogen forms near the top of the low-pressure column, substantially pure liquid oxygen forms near the bottom of the column, and an argon-rich oxygen gas forms toward the center of the column. The central, argon-rich fraction, called raw argon, is drawn from the low-pressure column and is fed via a stream to an auxiliary, crude argon column. The raw argon stream is rectified into an oxygen rich reflux, which is then sent back to the low-pressure column to be condensed, and crude argon, which can either be sent along as product or further refined.

The raw argon stream, in addition to containing oxygen, typically contains a small amount of nitrogen. The presence of nitrogen creates several processing concerns when recovering argon. To maximize the amount of argon recovered, it is necessary to maximize the amount raw argon extracted from the low-pressure column, and minimize the amount of oxygen extracted in the raw argon stream. Increasing the amount of raw argon drawn from the low-pressure column, however, also increases the amount of nitrogen drawn from the low-pressure column and sent to the crude argon column. If the amount of nitrogen becomes too high, the nitrogen pressure in the top of the crude argon column will have a detrimental effect on the heat transfer ability of the argon condenser, which will negatively affect the flow of gas up the column. Specifically, when the nitrogen concentration in the crude argon column passes a threshold value, the gas flow becomes insufficient to support the liquid hold-up in the column. The liquid falls down the crude argon column and back into the low-pressure column. This is known as "dumping" the crude argon column. The effects of dumping include not only a loss of argon recovery, but also the introduction of significant quantities of liquid into the low-pressure column that contaminate oxygen and nitrogen product purities. Dumping, then, is a costly economic penalty of the operation at high argon recovery rates. To avoid dumping, plants intentionally recover argon at rates significantly below the maximum recovery rate for the plant. Argon is a valuable by-product of the air separation product; consequently, reducing argon column product flow is economically undesirable. In addition, it is desirable to maximize the recovery of argon regardless of the plant mode (i.e., regardless of which product the air separation unit is attempting to produce).

A variety of different approaches are known in the art that attempt to maximize the recovery of argon in an air separation system, while minimizing the risk of dumping. For example, U.S. Pat. No. 4,842,625 to Allam et al. describes a cryogenic air separation process wherein the pressure of the feed gas to the argon column is reduced across a control valve and the argon column is operated at its lowest possible pressure, consistent with a minimum temperature difference across the overhead condenser and the unrestricted return of crude oxygen vapor from the overhead condenser to the low pressure column.

U.S. Pat. Nos. 5,313,800 and 5,448,893 to Howard et al. describes a process for maximizing the recovery of argon wherein a compositional measurement is made of a process variable at one or more preselected stages of rectification, which have been identified as exhibiting high sensitivity to plant process variations. The total nitrogen content in the argon feed is then computed by simulated mathematical correlation from the measurement.

U.S. Pat. No. 5,469,710, also to Howard et al. describes a cryogenic air separation system for improving argon recovery, wherein vapor from the argon column top condenser is turbo-expanded to generate refrigeration and then passed into the lower pressure column.

U.S. Pat. No. 4,784,677 to Al-Chalabi describes a method and apparatus for controlling a process for the separation of air to obtain oxygen, argon, and nitrogen products, and for controlling the composition of the feedstream to a column for producing crude argon. The nitrogen content of the feedstream is directly analyzed in real time and maintained within a preselected range. The results of the analysis are then used to control the operation of the process, for example, by adjusting the reflux or product withdrawal rates.

While each of the systems described above provides certain efficiencies and advantages, there still exists a need to provide an air separation system including a crude argon column that optimizes the recovery of argon while minimizing the chance of dumping.

SUMMARY OF THE INVENTION

Accordingly, it is an object of the present invention to provide an integrated air separation and process control system that optimizes argon recovery during system operation.

It is another the object of the present invention to use a multivariable predictive controller (MVPC) to regulate system conditions.

It is yet another object of the present invention to provide an argon-producing air separation system including an MVPC that uses a pseudo manipulated variable to push the upper and lower raw argon purity ("bubble") limits gradually downward until the nitrogen in the crude argon stream reaches its controllable maximum.

It is still another the object of the present invention to provide an air separation system including an MVPC that achieves maximum argon recovery in any ASU operation mode by minimizing the argon purity of the raw argon stream until the amount of nitrogen ($N_2$) in the stream is at its controllable maximum and maximizing the flow of the crude argon stream until the oxygen ($O_2$) content of the stream is at its controllable maximum.

The aforesaid objects are achieved individually and/or in combination, and it is not intended that the present invention be construed as requiring two or more of the objects to be combined unless expressly required by the claims attached hereto.

According to the present invention, an air separation system includes a low pressure column, a high pressure, a crude argon column, and a multivariable predictive controller that simultaneously (1) minimizes the argon purity of the raw argon stream drawn from the low pressure column until the amount of nitrogen ($N_2$) in the crude argon stream, as measured in the crude argon stream exiting the crude argon column, is at its controllable maximum and (2) maximizes the flow of crude argon stream drawn from the crude argon column until the oxygen ($O_2$) content of the crude argon stream is at its controllable maximum. The above and still further objects, features, and advantages of the present invention will become apparent upon consideration of the following detailed description of specific embodiments thereof, particularly when taken in conjunction with the accompanying drawings wherein like reference numerals in the various figures are utilized to designate like components

DESCRIPTION OF PREFERRED EMBODIMENTS

Figure 1:
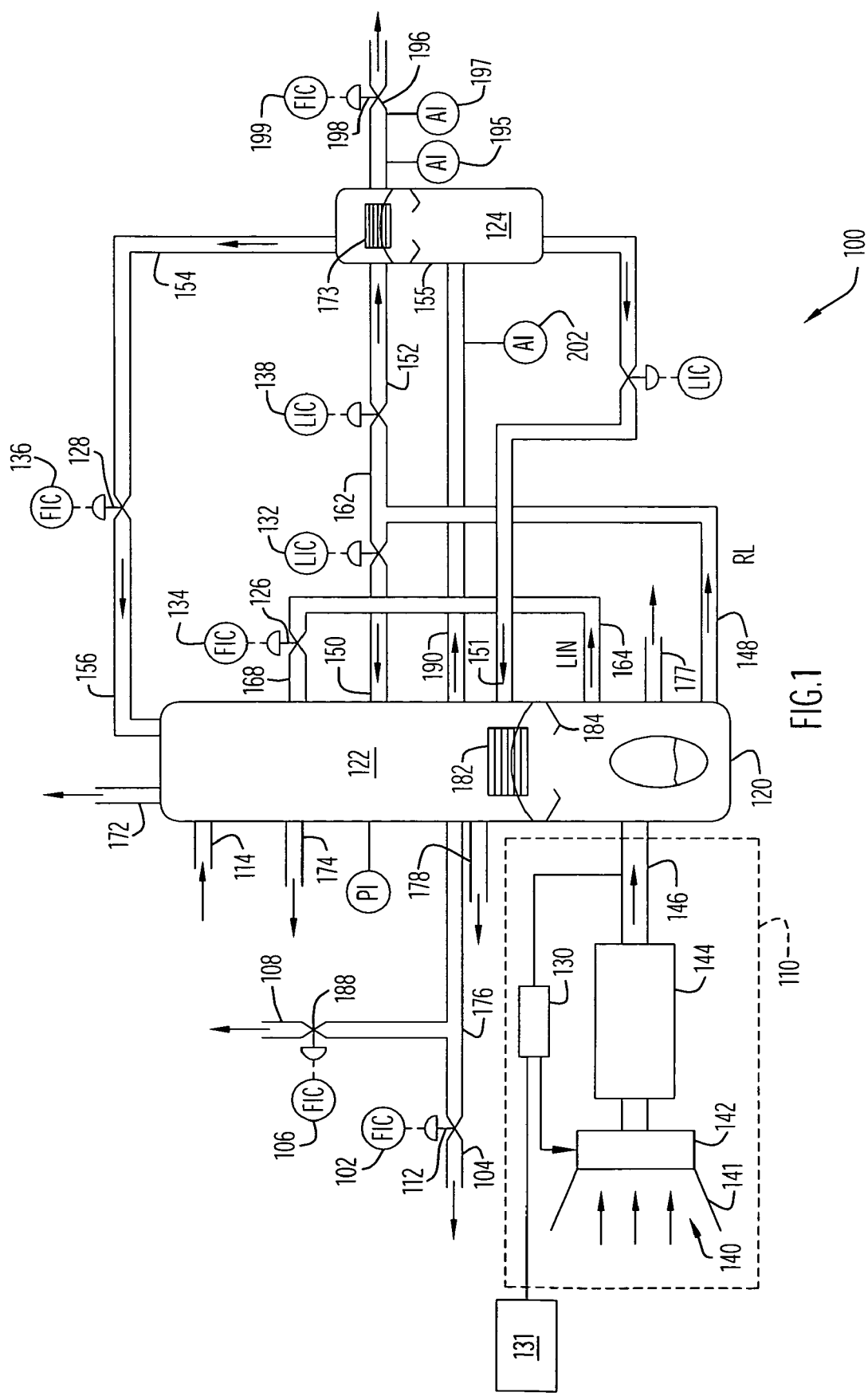
FIG. 1 is a schematic of an exemplary air separation unit including an MVPC controller.

A typical system including an air separation unit (ASU) is disclosed in U.S. Pat. No. 6,622,521, which is herein incorporated by reference in its entirety. Referring to FIG. 1, an ASU can be configured such that atmospheric air is brought into the plant via an air input subsystem 110. The air input subsystem 110 may include an air inlet 140 with guide vanes 141, a filter 142, and an air treatment unit 144 including components such as an air compressor, a dryer, and a cooler. The dryer can further include one or more of molecular sieves, adsorption beds, desiccants, and front-end reversing exchangers. In an exemplary embodiment, the dryer uses a stream of waste nitrogen from another component within the air separation unit. The cooler, moreover, may comprise a high efficiency main heat exchanger. The treated flow of cool, dry, high-pressure air 146 is directed into a high-pressure, cryogenic distillation column 120. The composition of the high-pressure column is not limited, and may be of those conventionally known in the art (e.g., trayed or packed columns). In an exemplary embodiment, the air enters the high-pressure column 120 at a temperature of about –274° F.

The ASU also includes a low-pressure, cryogenic distillation column 122. The composition of the low-pressure column is not limited, and may be of those conventionally known in the art (e.g., trayed or packed columns). The high- and low-pressure columns may be contained within one unit, sharing a main condenser 182. Alternatively, the columns 120, 122 can be separate units. The low-pressure column 122 typically operates at pressures of 4–15 psi, although higher or lower pressures are also possible. The high-pressure column 120 (also known as a "medium pressure" column), operates at a pressure that is about seven-to-eight times the operating pressure of the low-pressure column, although higher or lower pressures can be used.

In the high-pressure column 120, nitrogen is separated from the cooled, high-pressure air 146, with nitrogen-rich vapor condensing at a condenser 182. The condensed nitrogen-rich vapor is collected using collection devices such as troughs 184. A stream 164 containing primarily the condensed nitrogen (called LIN reflux, or "pure" or "lean" nitrogen reflux) is drawn from the high-pressure column 120 and becomes feed 168 for the low-pressure column 122. A valve 126 controls the flow rate of the LIN reflux stream 168 into the low-pressure column 122. Additionally, medium pressure gaseous nitrogen 177 ("MP GAN") can be drawn from the high-pressure column.

The bottom of the high-pressure column 120 collects oxygen-rich liquid (called "rich liquid"). Typically, the rich liquid collected at the bottom of the column comprises about 40% oxygen. This rich liquid can be drawn off and used for various purposes. As shown in FIG. 1, a stream of rich liquid 148 is drawn from the high-pressure column 120 and used as feed for both the low-pressure column 122 and the crude argon distillation column 124. The rich liquid can also be drawn from the high-pressure column and used either as feed for other ASU components or as a product, although this is not shown.

The feeds to the low-pressure column 122 include the rich liquid feed 150 from the high-pressure column 120, the LIN reflux feed 168 from the high-pressure column 120, a vaporized, oxygen-rich liquid reflux 156 from the crude argon column, and a an oxygen rich liquid return feed 151 from the crude argon column. In addition, a supplementary nitrogen rich flow 114 ("LIN assist") can also be provided to the low-pressure column 122 from another source such as an auxiliary tank liquefier (not shown).

Due to differences in relative volatilities of oxygen, nitrogen, and argon, the low-pressure column separates the rich liquid 150, the LIN 168, and the rich liquid return 151 into their individual components. Specifically, the bottom of the low-pressure column 122 contains pure liquid oxygen (LOX), which may be drawn off as an LOX output stream 178 from the ASU. Directly above the LOX is gaseous oxygen (GOX) 176, which is either drawn off and collected as GOX product via a product output 104 or vented to the atmosphere via a GOX vent 108. Valves 112 and 188 control the flow the GOX product stream and GOX vent stream, respectively. The top of the low-pressure column 122 contains "pure" gaseous nitrogen (referred to as "low-pressure nitrogen" or "LP GAN"), which can be drawn off the column as nitrogen-rich product stream 172. In addition, a waste nitrogen stream 174 can be drawn off from the low-pressure column 122.

As noted above, a portion of the rich liquid 148 drawn from the high-pressure column 120 is sent as feed 150 to the low-pressure column 122. In addition, a portion of the rich liquid is sent as feed 152 to a crude argon distillation column 124. The composition of the crude argon column is not limited, and may comprise those conventionally known in the art. For example. The column may include trays, packed columns, etc. In addition, the column may be a cryogenic or a deoxo column. Along with the rich liquid, a stream 190 containing oxygen, argon, and a small amount of nitrogen (called an "argon-rich oxygen stream" or a "raw argon stream") is drawn from the low-pressure column 122 and supplied as reflux to the crude argon column 124. The crude argon column 124 washes oxygen out of the argon, as well as purges some remaining nitrogen to produce marketable liquid argon or crude argon that is further purified. The crude argon column includes a condenser 173 that condenses the oxygen, which is drawn from the crude argon column as a stream containing primarily oxygen-rich liquid reflux 154, which can then be fed to the low-pressure column. The crude argon column also produces an argon-rich stream 196 ("crude argon stream") as a product, which has a greater percentage of argon than the raw argon stream. The composition of the crude argon stream can be measured using an oxygen composition analyzer (AI) 195 and a nitrogen composition analyzer (AI) 197. The argon amount may then be extrapolated from these values; alternatively, an argon composition analyzer may be used. A valve 198 controls the flow of the crude argon stream 196. The valve, in turn, is controlled by a controller 199 (e.g., and FIC controller). Controlling crude argon flow can control the overall purity of the crude argon product. Generally, increasing the crude argon flow increases the amount of oxygen present in the crude argon product. Consequently, it may be necessary to further process the crude argon product using another processing unit such as a "pure argon" column (not shown). The final purity of the argon product may be adjusted to any desired level based on plant capability, industry standards, customer specifications, etc.

As will be clear to one skilled in the art, many other configurations of air separation units may be formed, producing greater or fewer types of products. For example, the system may also include composition analyzers that determine the content (e.g., volume percent) of argon, nitrogen, and oxygen at various points throughout the ASU. Furthermore, additional, ancillary streams may enter either or both of the high-pressure and low-pressure columns.

Air separation units are controlled by a hierarchy of control elements known in the art, including, without limitation, field controllers, regulatory controllers, advanced process controllers, supervisory level controllers, an operation control center, a monitoring system, and distributed control system. The activities within the ASU are directly controlled by a plurality of field devices such as valves, pumps, compressors, guide vanes, and other devices. The field devices, in turn, are controlled by regulatory controllers such as proportional-integral-differential (PID) controllers, FIC controllers, LIC controllers, deadband controllers, gap controllers, model free adaptive (MFA) controllers, or hand indicating controllers (HICs). The setpoints for the controllers may be entered either by human operators, by another (e.g., higher level) controller, or both.

Regulatory controllers regulate the field devices of the ASU plant using high-speed control algorithms (typically less than one second) based on setpoints provided by supervisory or advanced process controllers. Referring to FIG. 1, a controller 130 (e.g., a PID controller) is used to control the guide vanes 141 of the air intake subsystem 110 to adjust the flow of air 146 into the high-pressure column 120. In addition, controller 134 (e.g., an FIC controller) is used to control the valve 126 that adjusts the flow rate of the LIN stream 168 into the low-pressure column 122. Furthermore, a controller 132 (e.g., an LIC controller) is used to control the valve 162 that adjusts the flow rate of the rich liquid stream 150 into the low-pressure distillation column 122. A controller 138 (e.g., an LIC controller) is also be used to adjust the flow rate of the rich liquid stream 152 from the high-pressure column 120 to the crude argon column 124. A controller 136 (e.g., an FIC controller) is used to control the valve 128 that adjusts the flow rate of the vaporized oxygen-rich reflux stream 156 from the crude argon column 124 into the low-pressure column 122. Additionally, controllers 102, 106 (e.g., FIC controllers) are used to control the GOX product valve 112 and the GOX vent valve 188, respectively. Finally, a controller 199 is used to control the valve 198 that controls the flow of the crude argon stream from the crude argon column 124.

An advanced process controller 131 manipulates each of these regulatory controllers. Typically, the field devices, regulatory controllers, and advanced process controllers are part of a larger process control system used in monitoring and controlling the parameters of air separation units. An exemplary process control system is disclosed in Published Patent Application US 2002/0017113, incorporated herein by reference in its entirety.

Through proper manipulation of control elements, air separation units can be operated in a manner designed to maintain the quality of the products at a specified level, optimize the product yield, stabilize the process (e.g., adjust process conditions to maintain the ASU operation within process and equipment constraint limits, and minimize transient disturbances when the unit is being ramped to new feed or product targets), and maximize the feed throughput for a given energy consumption.

As noted above, optimizing the recovery of argon presents certain difficulties. To maximize argon recovery, the raw argon flow must be optimized and its oxygen content must be minimized. However, increasing the raw argon flow while decreasing the oxygen content of the raw argon stream 190 can result in an appreciable increase in the nitrogen concentration of the stream and, consequently, an increase in the amount of nitrogen sent to the crude argon column. This increases the risk of dumping the column.

Furthermore, increasing the amount of argon in the raw argon stream results in an increase in the amount of recoverable in the crude argon stream 196 coming off the crude argon column 124. Consequently, in order to obtain more crude argon as product, it is also necessary to increase the flow of the crude argon stream 196 coming off the column. Increasing the flow of the crude argon stream increases the amount of oxygen therein. In this manner, controlling the flow of the crude argon stream enables an ASU to meet purity guidelines required by the end product.

With this knowledge, it has been determined that in order to achieve maximum argon recovery in a system including an ASU, the concentration of argon in the raw argon stream should be maximized by decreasing the concentration of oxygen in the raw argon stream (referred to as "raw argon purity" or "bubble purity") while simultaneously preventing the concentration of nitrogen in the crude argon stream from exceeding a controllable maximum (i.e., a threshold) value. In addition, it has been determined that the flow of the crude argon stream emerging from the crude argon column should be maximized until the oxygen concentration of the crude argon stream is at its controllable maximum (i.e., highest oxygen concentration value permitted in the crude argon stream product as determined by industry standards). The concentration of each component (argon, oxygen, and nitrogen) within the ASU system is typically measured percent volume; however, other conventional measurements may be used.

The composition control parameters for the raw argon and crude argon streams, as described above, are achieved automatically in the system of the present invention by integrating a controller within the system that employs an integrated matrix approach to automatically define and control system setpoints by continually adjusting manipulated variables, monitoring and respecting process constraints, and incorporating the effect of measured process disturbances. Specifically, a multivariable predictive controller (MVPC) is provided that uses dynamic response models to predict the responses of constraint variables and to move the manipulated variables in a manner that is calculated to minimize transient and steady state deviations. The MVPC can be integrated with a controller 131 or alternatively, can be a separate controller in communication with controller 131 as well as any one or more of the other controllers described above in order to control system operation as described below.

The multivariable predictive controller (MVPC) is an advanced process controller that writes to setpoints or targets rather than directly manipulating output to regulatory controllers. The MVPC further identifies relationships between constraint variables and manipulated variables, and then optimizes the process using the identified relationship. A constraint variable is a dependent variable whose deviation outside of a target range is minimized. A manipulated variable is an operator- or computer-adjusted variable that defines changes in setpoints affecting the constraint variables. Manipulated variables set not only high and low limits for a given control parameter, but also its rate of change. In addition, the MVPC accounts for repeatable process disturbances (e.g., those caused by exterior and interior fluctuations such as temperature changes and system upsets) by identifying the relationship between disturbance variables and the control variables. Responses to process disturbances are modeled by perturbing the independent process variables (manipulated variables such as the feed rate and reflux rate), measuring the response of the dependent variables (control variables) (e.g., product qualities and column temperatures), and developing models of responses to different process disturbance levels. For example, an independent process variable may be perturbed by approximately ±3% to study their interactions with dependent variables.

Thus, the MVPC is used to write setpoints for manipulated and constraint variables for regulatory controllers in an ASU to not only minimize the oxygen concentration in the raw argon stream (bubble purity) to adjust the nitrogen concentration in the crude argon stream to its controllable maximum, but also to maximize the crude argon flow (i.e., the flow of the crude argon stream) until the oxygen content of the crude argon stream is at its controllable maximum. An example of a suitable multivariable predictive controller is a goal-maximizing controller available from Intelligent Optimization, Inc. of Houston, Tex., under the trade name GMaxC®. The Technical Bulletin, entitled "GMAXC: Goal Maximizing Controller (Version 5.3.9 Windows™ 32 bit Operating System)" is incorporated herein by reference in its entirety.

To maximize argon recovery in air separation unit of the present invention, various constraint variables and manipulated variables are established within the system. Exemplary constraint variables include, without limitation, (1) the purity of the gas oxygen flow 176 (GOX purity, measured in, e.g., percent oxygen), (2) the purity of the raw argon flow 190 (bubble purity, measured in, e.g., percent oxygen), (3) the flow amount of gas oxygen vented to the environment 108 (vent GOX), (4) the impurity of the low pressure nitrogen flow 172 (measured in amount of oxygen (e.g., percent or ppm)), (5) the impurity of the LIN reflux 168 (measured in amount of oxygen (e.g. percent or ppm)), (6) the purity of the raw argon stream at the midpoint 155 of the crude argon column (raw argon midpoint purity, measured in percent oxygen), (7) the amount of oxygen in the crude argon flow 196 (measured in amount of oxygen (e.g., percent or ppm)), and (8) the amount of nitrogen in the crude argon flow 196 (measured in, e.g., percent nitrogen). Additional or fewer constraint variables may be used, depending on the system requirements and desired output of the ASU. Exemplary manipulated variables include (1) the flow amount of gaseous oxygen 176 out of the low-pressure column (GOX flow), (2) flow amount of the LIN reflux 168 into the low-pressure column (LP column reflux), (3) the flow amount of the LIN assist 114 into the low-pressure column (LIN assist), (4) the flow amount of crude argon 196 drawn from the crude argon column 124, and (5) the flow amount of air drawn into the unit 140. Similar to the constraint variables, additional or fewer manipulated variables may be used, depending on system requirements.

Any one or more manipulated variables are controlled (manually and/or automatically) to meet the parameters established by the constraint variables, which, in turn, not only controls the composition of the raw argon stream 190 fed to the crude argon column 124, but also the composition of the crude argon stream 196 emerging from the crude argon column 124. The control of one or more combinations of manipulated variables to yield one or more desired changes in constraint variables and raw and crude argon stream compositions is known in the ASU art.

Along with the above-mentioned manipulated variables, the MVPC of the present invention uses an additional, pseudo-manipulated variable that defines and changes high and low limits for a raw argon purity constraint variable. The purity of argon in the raw argon stream is measured indirectly by measuring oxygen concentration, referred to as "raw argon purity" or "bubble purity" of the raw argon stream 190. Alternatively, it is noted that the concentration of argon could also be measured directly in the raw argon stream. The argon content of the stream 190 can be determined, for example, by utilizing a composition analyzer (AI) 202 located upstream from the crude argon column. Additionally, the analyzer can measure any one or more of the concentrations of argon, oxygen, and nitrogen either in the raw argon stream, or at any points throughout the separation unit.

The MVPC further utilizes a bubble limit, which is a pseudo-manipulated variable that maintains the bubble purity of the raw argon stream at or near a desired value or range of values. The bubble limit is a pseudo-manipulated variable because it does not directly control a field device or a control element. The bubble limit provides upper and lower set points within which the bubble purity is to be maintained, and the regulatory controllers are manipulated to control the manipulated variables in a known manner to achieve control of one or more constraint variables, as well as to control the bubble purity. Once one or more constraint values are observed by the MVPC, the MVPC readjusts the various field devices as necessary to enhance control of the constraint values and bubble purity. In addition to providing upper and lower setpoints, the bubble limit further provides a rate at which the upper and lower set points can change. For example, depending upon the response of constraint variables, bubble purity and nitrogen concentration in the raw argon stream, the MVPC may modify the upper and lower bubble limit values by no more than 0.10% per minute.

In use, the bubble limit functions to slowly push the bubble purity toward the bubble low limit (i.e., the minimum possible oxygen concentration in the raw argon stream) and further functions to push the upper and lower setpoints down until $N_2$ in the crude argon stream is at its controllable maximum (i.e., the highest concentration percentage of nitrogen permissible in the crude argon stream that does not cause the liquid hold-up to collapse or cause "dumping" in the crude argon column). This controllable maximum value for $N_2$ varies depending on the type of air separation unit, the composition of the crude argon column, the desired product output, and the purity level of the output. For example, the controllable maximum for $N_2$ in the crude argon stream for a given system is typically less than about 5% nitrogen, preferably less than about 4%, more preferably less than about 2%. The low setpoint (or bubble low limit corresponding to a minimum desired bubble purity in the raw argon stream) of the bubble limit is typically configured to be the output of the pseudo-multivariable bubble limit, and the high setpoint (or bubble high limit corresponding to a maximum desired bubble purity in the raw argon stream) is typically a fixed, but adjustable, value that is offset from the bubble low limit. The value of the offset is not limited, and depends on the requirements of a particular ASU. For example, the offset value can be in the range of about 0.80%.

As the MVPC adjusts the bubble purity of the raw argon stream in an attempt to stay within the bubble limit, while always approaching the bubble low limit (i.e., lowest possible concentration of oxygen in the stream), the amount of nitrogen present in the crude argon eventually rises, and the manipulated variable bubble limits are then raised to eliminate excess nitrogen over-accumulation in the crude argon column, preventing the amount of nitrogen from reaching its maximum controllable limit. With lowered raw argon purity, more argon can be extracted out of the crude argon column.

In addition to minimizing argon purity in the raw argon stream until the nitrogen content is at its controllable maximum, the MVPC is modified to simultaneously and automatically maximize the crude argon flow until the oxygen content of the stream is at its controllable maximum. That is, the MVPC slowly pushes the oxygen ($O_2$) in the crude argon stream to its controllable maximum (i.e., the highest amount of oxygen permitted in the crude argon stream 196 for the desired output) by increasing the flow rate of the stream. The controllable maximum value of oxygen content in the crude argon stream can vary, and is typically based on industry requirements. For example, this value is typically no more than about 4 ppm (4% for deoxy argon ASU plants), preferably no more than about 3.5 ppm (3.5% for deoxy argon ASU plants), and more preferably no more than about 2 ppm (2% for deoxy argon ASU plants).

Figure 2:
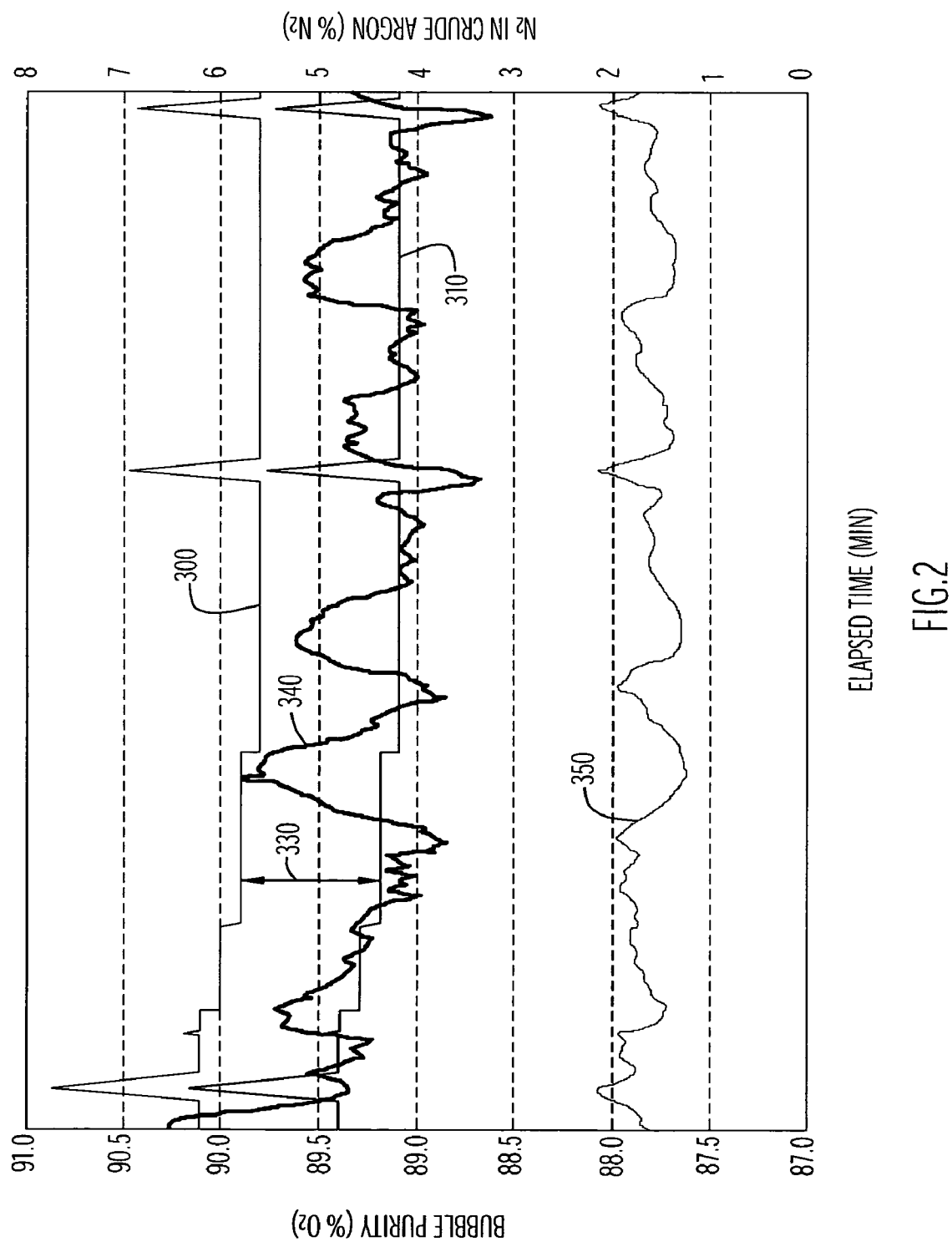
FIG. 2 is a chart depicting the control of raw argon purity in the raw argon stream, including an indication of the amount on nitrogen in the crude argon stream, as measured in the crude argon stream leaving the crude argon column.

The control of bubble purity, bubble limit values, and nitrogen concentration during operation in the system of FIG. 1 and utilizing an MVPC-controlled system can be seen in the chart depicted in FIG. 2. The figure shows the bubble low limit (pseudo-manipulated variable) 310, the bubble high limit (offset from the bubble low limit) 300, the offset value 330, the measured bubble purity (constraint) value 340 (vol % $O_2$), and the measured amount of nitrogen in crude argon (vol % $N_2$, as measured in the crude argon column). These bubble purity and nitrogen concentration values are continuously measured over units of elapsed time (e.g., seconds or minutes), and the bubble limit values are adjusted accordingly as described above to ensure maximum argon recovery in system while preventing the concentration of nitrogen from exceeding a maximum controllable value in the crude argon column. As can be seen, the MVPC, through the bubble limits 300, 310, gradually pushes the bubble purity 340 progressively downward, limited by user-defined increments (e.g., 0.10%/min). As time progresses, the system continuously adjusts field elements as directed by regulators to meet the setpoints defined by the manipulated variables. The bubble limits 300, 310 progress downward until the nitrogen purity 350 reaches the maximum controllable value (e.g., about 2% $N_2$). As the measured nitrogen concentration approaches the maximum controllable value, the MVPC controls system operation as described above to raise the bubble limit values 300, 310 and the bubble purity in the raw argon stream 340, thus resulting in the concentration of nitrogen being reduced to a safe level below its controllable maximum value.

Thus, the MVPC-based argon recovery system of the present invention achieves automatic control of reducing oxygen concentration in the raw argon stream (as indicated by the measured bubble purity value) to its lowest possible value, so as to maximize the argon concentration in the stream, while simultaneously ensuring the nitrogen concentration in the raw argon stream does not exceed a maximum controllable amount as measured in the crude argon stream. The MVPC-based ASU achieves this dynamically, maximizing argon recovery regardless of the mode of the system. That is, the system of the present invention optimizes the argon recovery process regardless of the system production combinations (e.g., LIN/LOX/GAN/GOX, etc).

Having described novel air separation system that maximizes argon recovery using a multivariable predictive controller, it is believed that other modifications, variations and changes will be suggested to those skilled in the art in view of the teachings set forth herein. It is therefore to be understood that all such variations, modifications and changes are believed to fall within the scope of the present invention as defined by the appended claims.

The invention claimed is:

1. A system for optimizing the recovery of argon comprising:
    an air input subsystem configured to intake and process atmospheric air;
    at least one distillation column to receive a processed air stream from the air input and to output a raw argon stream, wherein the at least one distillation column is located downstream from the air input system;
    a crude argon column to receive and process the raw argon stream and to output a crude argon stream; and
    a controller to automatically control the composition of the raw argon stream so as to decrease a concentration of oxygen in the raw argon stream while preventing a concentration of nitrogen in the crude argon stream from exceeding a selected value, wherein the controller is a multivariable predictive controller that effects control of at least one constraint variable and to at least one manipulated variable, wherein the at least one constraint variable includes at least one of: liquid nitrogen reflux impurity and raw argon stream midpoint purity.

2. A system for optimizing the recovery of argon comprising:
    an air input subsystem configured to intake and process atmospheric air;
    at least one distillation column to receive a processed air stream from the air input and to output a raw argon stream, wherein the at least one distillation column is located downstream from the air input system;
    a crude argon column to receive and process the raw argon stream and to output a crude argon stream; and
    a controller to automatically control the composition of the raw argon stream so as to decrease a concentration of oxygen in the raw argon stream while preventing a concentration of nitrogen in the crude argon stream from exceeding a selected value, wherein the controller is a multivariable predictive controller that effects control of at least one constraint variable and to at least one manipulated variable, wherein the at least one manipulated variable includes at least one of: liquid nitrogen reflux flow amount into the low-pressure column.

3. A system for optimizing the recovery of argon comprising:
an air input subsystem configured to intake and process atmospheric air;
at least one distillation column to receive a processed air stream from the air input and to output a raw argon stream, wherein the at least one distillation column is located downstream from the air input system;
a crude argon column to receive and process the raw argon stream and to output a crude argon stream; and
a controller to automatically control the composition of the raw argon stream so as to decrease a concentration of oxygen in the raw argon stream while preventing a concentration of nitrogen in the crude argon stream from exceeding a selected value, wherein the controller is a multivariable predictive controller that effects control of at least one constraint variable and to at least one manipulated variable, wherein the controller further effects control by selectively regulating the composition of the raw argon stream by either increasing the concentration of oxygen in the raw argon stream to approach an upper oxygen concentration limit or decreasing the concentration of the oxygen in the raw argon stream to approach a lower oxygen concentration limit.

4. In a system including an air intake subsystem, at least one distillation column, a crude argon distillation column, and a controller; a process for optimizing the recovery of argon in a an air separation unit comprising the steps of:
(a) directing a flow of atmospheric air into the air intake subsystem and processing the atmospheric air;
(b) directing the processed air from the air intake subsystem into at least one distillation column to produce at least one raw argon stream;
(c) directing the at least one raw argon stream from the at least one distillation column to a crude argon distillation column to process the raw argon stream and to output a crude argon stream; and
(d) automatically controlling the composition of the raw argon stream via the controller so as to decrease a concentration of oxygen in the raw argon stream while preventing a concentration of nitrogen in the crude argon stream from exceeding a selected value, wherein the controller is a multivariable predictive controller that effects control of at least one constraint variable and at least one manipulated variable, wherein the at least one constraint variable includes at least one of: liquid nitrogen reflux impurity, raw argon stream midpoint purity.

5. In a system including an air intake subsystem, at least one distillation column, a crude argon distillation column, and a controller; a process for optimizing the recovery of argon in a an air separation unit comprising the steps of:
(a) directing a flow of atmospheric air into the air intake subsystem and processing the atmospheric air;
(b) directing the processed air from the air intake subsystem into at least one distillation column to produce at least one raw argon stream;
(c) directing the at least one raw argon stream from the at least one distillation column to a crude argon distillation column to process the raw argon stream and to output a crude argon stream; and
(d) automatically controlling the composition of the raw argon stream via the controller so as to decrease a concentration of oxygen in the raw argon stream while preventing a concentration of nitrogen in the crude argon stream from exceeding a selected value, wherein the controller is a multivariable predictive controller that effects control of at least one constraint variable and at least one manipulated variable, wherein the at least one manipulated variable includes at least one of: amount of liquid nitrogen reflux flow into the low-pressure column.

6. In a system including an air intake subsystem, at least one distillation column, a crude argon distillation column, and a controller; a process for optimizing the recovery of argon in a an air separation unit comprising the steps of:
(a) directing a flow of atmospheric air into the air intake subsystem and processing the atmospheric air;
(b) directing the processed air from the air intake subsystem into at least one distillation column to produce at least one raw argon stream;
(c) directing the at least one raw argon stream from the at least one distillation column to a crude argon distillation column to process the raw argon stream and to output a crude argon stream; and
(d) automatically controlling the composition of the raw argon stream via the controller so as to decrease a concentration of oxygen in the raw argon stream while preventing a concentration of nitrogen in the crude argon stream from exceeding a selected value, wherein the controller is a multivariable predictive controller that effects control of at least one constraint variable and at least one manipulated variable, wherein the controller further effects control through selective regulation of the composition of the raw argon stream by either increasing the concentration of oxygen in the raw argon stream to approach an upper oxygen concentration limit or decreasing the concentration of oxygen in the raw argon stream to approach a lower oxygen concentration limit.

* * * * *